US012112720B2

(12) United States Patent
Asanuma

(10) Patent No.: US 12,112,720 B2
(45) Date of Patent: Oct. 8, 2024

(54) DISPLAY APPARATUS, DISPLAY SYSTEM, DISPLAY CONTROL METHOD, AND NON-TRANSITORY RECORDING MEDIUM

(71) Applicant: Kohdai Asanuma, Kanagawa (JP)

(72) Inventor: Kohdai Asanuma, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 49 days.

(21) Appl. No.: 17/813,996

(22) Filed: Jul. 21, 2022

(65) Prior Publication Data

US 2023/0067554 A1 Mar. 2, 2023

(30) Foreign Application Priority Data

Aug. 30, 2021 (JP) ................................ 2021-140045

(51) Int. Cl.
*G09G 5/02* (2006.01)
*G09G 5/00* (2006.01)

(52) U.S. Cl.
CPC ............... *G09G 5/02* (2013.01); *G09G 5/003* (2013.01); *G09G 2320/0666* (2013.01); *G09G 2354/00* (2013.01)

(58) Field of Classification Search
None
See application file for complete search history.

(56) References Cited

U.S. PATENT DOCUMENTS

2014/0161353 A1* 6/2014 Ma ...................... G06V 30/413 382/176

FOREIGN PATENT DOCUMENTS

| | | | | |
|---|---|---|---|---|
| JP | 2003-069767 | | | 3/2003 |
| JP | 2003069767 | A | * | 3/2003 |
| JP | 2006-005517 | | | 1/2006 |
| JP | 2006005517 | A | * | 1/2006 |
| JP | 2019-032604 | | | 2/2019 |
| JP | 2019032604 | A | * | 2/2019 |

* cited by examiner

*Primary Examiner* — Yi Wang
(74) *Attorney, Agent, or Firm* — IPUSA, PLLC

(57) ABSTRACT

A display apparatus includes circuitry to display, on a display, an image including a table, receive an operation of specifying a range to be edited in the image, acquire coordinates of lines of the table in the range, and change a color of pixels other than pixels corresponding to the lines in the range to a predetermined color.

11 Claims, 13 Drawing Sheets

DISPLAY APPARATUS, DISPLAY SYSTEM, DISPLAY CONTROL METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2021-140045, filed on Aug. 30, 2021, in the Japan Patent Office, the entire disclosure of which is hereby incorporated by reference herein.

BACKGROUND

Technical Field

Embodiments of the present disclosure relate to a display apparatus, a display system, a display control method, and a non-transitory recording medium.

Related Art

Efficient editing using original image information is performable by editing a range such as a part of an entry section or a part of a table included in an image acquired by a device such as a scanner or a facsimile. Such editing is performed by deleting information in a specified range of an image and then inserting information such as characters to the specified range.

SUMMARY

An embodiment of the present disclosure includes a display apparatus including circuitry to display, on a display, an image including a table, receive an operation of specifying a range to be edited in the image, acquire coordinates of lines of the table in the range, and change a color of pixels other than pixels corresponding to the lines in the range to a predetermined color.

An embodiment of the present disclosure includes a display system including a display apparatus and a terminal device communicably connected to the display apparatus. The display apparatus includes display apparatus circuitry to display, on a display, an image including a table, receive an operation of specifying a range to be edited in the image, acquire coordinates of lines of the table in the range, and change a color of pixels other than pixels corresponding to the lines in the range to a predetermined color. The terminal device includes terminal device circuitry configured to output on a screen of the display apparatus, the image including the table.

An embodiment of the present disclosure includes a display system including a display apparatus and a storage server communicably connected to each other. The display apparatus includes display apparatus circuitry to display, on a display, an image including a table, receive an operation of specifying a range to be edited in the image, acquire coordinates of lines of the table in the range, and change a color of pixels other than pixels corresponding to the lines in the range to a predetermined color. The storage server includes storage server circuitry to store image data representing the image including the table and transmit the image data to the display apparatus. The display apparatus displays the image including the table based on the image data received from the storage server.

An embodiment of the present disclosure includes a display control method including displaying, on a display, an image including a table, receiving an operation of specifying a range to be edited in the image, acquiring coordinates of lines of the table in the range, and changing a color of pixels other than pixels corresponding to the lines in the range to a predetermined color.

An embodiment of the present disclosure includes a non-transitory recording medium storing a plurality of instructions which, when executed by one or more processors, causes the processors to perform a method. The method includes displaying, on a display, an image including a table, receiving an operation of specifying a range to be edited in the image, acquiring coordinates of lines of the table in the range, and changing a color of pixels other than pixels corresponding to the lines in the range to a predetermined color.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
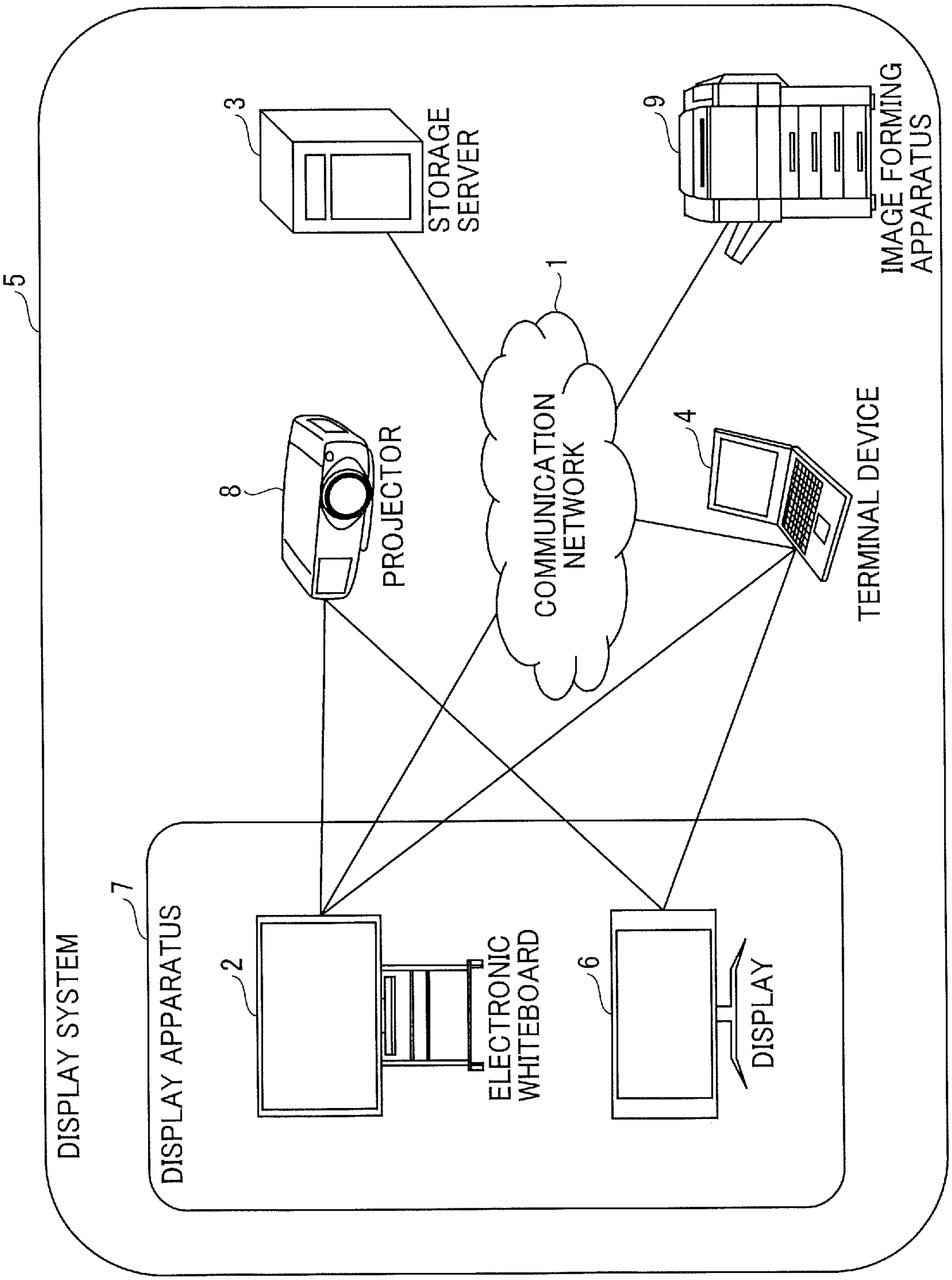
FIG. 1 is a schematic diagram illustrating an example of a display system according to an exemplary embodiment of the disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A display apparatus, a display system, a display control method, and a non-transitory recording medium according to one or more embodiments of the present disclosure are described below with reference to the attached drawings.

First Embodiment

System Configuration

FIG. 1 is a schematic diagram illustrating an example of a display system 5 according to an embodiment of the present disclosure. In the display system 5 illustrated in FIG. 1, a display apparatus 7 may be one that includes a touch panel display or a display dedicated to displaying of images. In a case of the display apparatus 7 including a display dedicated to displaying of images, a user operation including an operation for displaying or editing an image is performed by using a keyboard or a pointing device of a terminal device 4 connected to the display apparatus 7.

An electronic whiteboard 2 is connected to the terminal device 4, an image forming apparatus 9, and a storage server 3 via a communication network 1. Alternatively, the electronic whiteboard 2 or the display 6 is connected to a projector 8 or the terminal device 4 via a display cable. The electronic whiteboard 2 displays, on the screen, image data acquired from the terminal device 4, the image forming apparatus 9, or the storage server 3 via the communication network 1. Alternatively, the electronic whiteboard 2 and the display 6 display, on the screen, an image output from the terminal device 4 or the projector 8 connected by a cable. The storage server 3 stores image data to be displayed on the display apparatus 7. The image forming apparatus 9 acquires image data to be displayed on the display apparatus 7 by using a scan function. Alternatively, the image data may be captured by a camera, or may be an electronic file created by an application for such as document creation, spreadsheet, presentation, or image editing executed by the terminal device 4, for example.

The configuration of the display system 5 illustrated in FIG. 1 is an example, and another configuration may be used. For example, the display apparatus 7 may be a terminal device 4, a tablet terminal, or a smartphone, and the storage server 3 may be a device that is outside of the display system 5 and connected to the communication network 1.

Hardware Configuration (Electronic Whiteboard 2)

Figure 2:
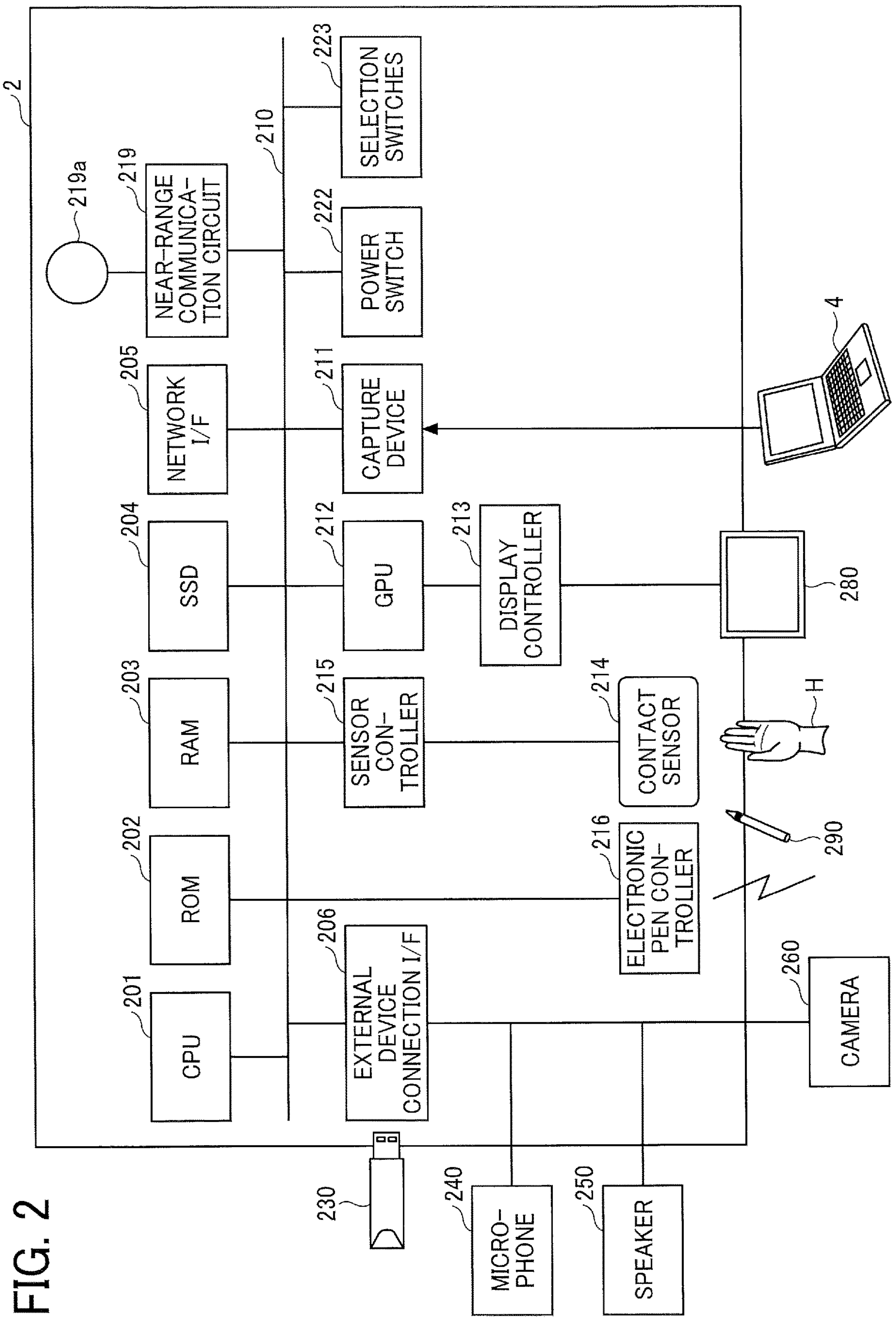
FIG. 2 is a block diagram illustrating a hardware configuration of an electronic whiteboard according to the exemplary embodiment of the disclosure.

FIG. 2 is a block diagram illustrating a hardware configuration applicable to the electronic whiteboard 2 according to the present embodiment. As illustrated in FIG. 2, the electronic whiteboard 2 includes a central processing unit (CPU) 201, a read only memory (ROM) 202, a random access memory (RAM) 203, a solid state drive (SSD) 204, a network interface (I/F) 205, and an external device connection I/F 206.

The CPU 201 controls the entire operation of the electronic whiteboard 2. The ROM 202 stores a control program such as an initial program loader (IPL) to boot the CPU 201. The RAM 203 is used as a work area for the CPU 201. The SSD 204 stores various data such as a control program for the electronic whiteboard. The network I/F 205 controls communication with an external device through the communication network 1.

The external device connection I/F 206 is an interface for connecting various external devices. Such external devices include a universal serial bus (USB) memory 230 and other external devices (a microphone 240, a speaker 250, and a camera 260).

The electronic whiteboard 2 further includes a capture device 211, a graphics processing unit (GPU) 212, a display controller 213, a contact sensor 214, a sensor controller 215, an electronic pen controller 216, a near-range communication circuit 219, and an antenna 219*a* for the near-range communication circuit 219, a power switch 222, and selection switches 223.

The capture device 211 acquires an image (video) information as a still image or a video (moving) image from the terminal device 4 such as a personal computer (PC), which is external to the electronic whiteboard 2, and causes a display 280 to display the still image or the video image. The GPU 212 is a semiconductor chip dedicated to graphics. The display controller 213 controls screen display to output an image processed by the GPU 212 to the display 280. The contact sensor 214 detects a touch onto the display 280 with an electronic pen 290 or a user's hand H. The sensor controller 215 controls operation of the contact sensor 214. The contact sensor 214 inputs and senses a coordinate by using an infrared blocking system. The inputting and detecting a coordinate may be as follows. For example, two light receiving and emitting devices are disposed at both ends of the upper face of the display 280, and a reflector frame surrounds the periphery of the display 280. The light receiving and emitting devices emit a plurality of infrared rays in parallel to a surface of the display 280. The rays are reflected by the reflector frame, and a light-receiving element receives light returning through the same optical path of the emitted infrared rays.

The contact sensor 214 outputs an identifier (ID) of the infrared ray that is blocked by an object after being emitted from the light receiving elements, to the sensor controller 215. Based on the ID of the infrared ray, the sensor controller 215 detects a specific coordinate that is touched by the object. The electronic pen controller 216 communicates with the electronic pen 290 to detect contact by the tip or bottom of the electronic pen with the display 280. The near-range communication circuit 219 is a communication circuit in compliance with, for example, the near field communication (NFC) or BLUETOOTH. The power switch 222 turns on or off the power of the electronic whiteboard 2. The selection switches 223 are a group of switches for adjusting brightness, hue, etc., of display on the display 280, for example.

The electronic whiteboard 2 further includes a bus line 210. The bus line 210 is an address bus or a data bus, which electrically connects the components illustrated in FIG. 2 such as the CPU 201.

The contact sensor 214 is not limited to the infrared blocking system type, and may be a different type of detector, such as a capacitance touch panel that identifies a contact position by detecting a change in capacitance, a resistance film touch panel that identifies a contact position by detecting a change in voltage of two opposed resistance films, or an electromagnetic induction touch panel that identifies a contact position by detecting electromagnetic induction caused by contact of an object to a display. In addition to or in alternative to detecting a touch by the tip or bottom of the electronic pen 290, the electronic pen controller 216 may also detect a touch by another part of the electronic pen 290, such as a part held by a hand of the user.

Hardware Configuration (Terminal Device 4, Storage Server 3)

Figure 3:
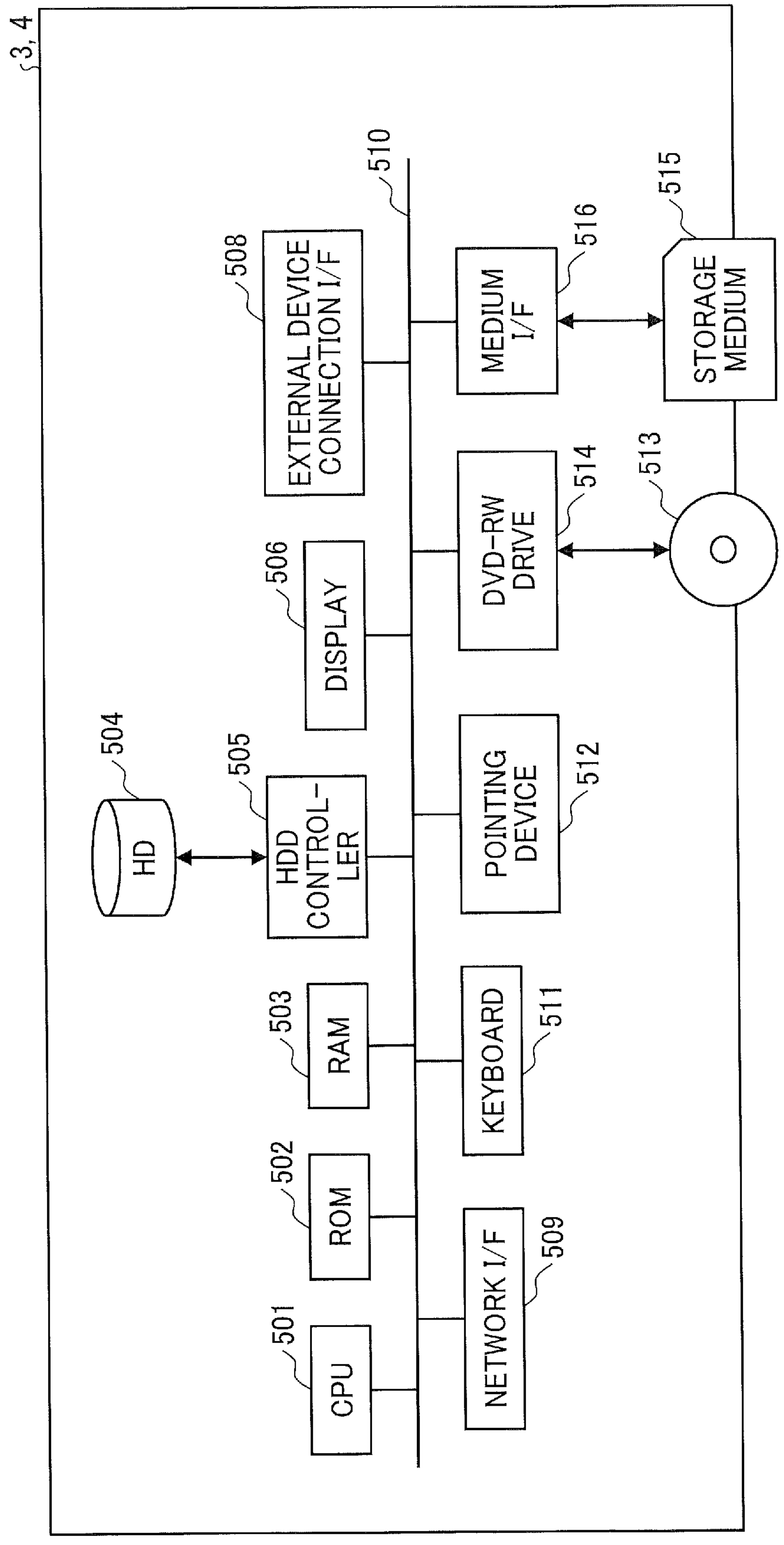
FIG. 3 is a block diagram illustrating an example of a hardware configuration of each of a terminal device and a storage server according to the exemplary embodiment of the disclosure.

FIG. 3 is a block diagram illustrating an example of a hardware configuration applicable to each of the terminal device 4 and the storage server 3 according to the present embodiment of the present disclosure. As illustrated in FIG. 3, each of the terminal device 4 and the storage server 3 is implemented by a computer, and includes a CPU 501, a ROM 502, a RAM 503, a hard disk (HD) 504, a hard disk drive (HDD) controller 505, a display 506, an external device connection I/F 508, a network I/F 509, a bus line 510, a keyboard 511, a pointing device 512, a digital versatile disc rewritable (DVD-RW) drive 514, and a medium I/F 516.

The CPU 501 controls the entire operation of each of the terminal device 4 and the storage server 3. The ROM 502 stores programs such as an initial program loader (IPL) to boot the CPU 501. The RAM 503 is used as a work area for the CPU 501. The HD 504 stores various data such as a program. The HDD controller 505 controls reading and writing of various data from and to the HD 504 under control of the CPU 501. The display 506 displays various information such as a cursor, a menu, a window, a character, or an image. The external device connection I/F 508 is an interface that connects to various external devices. Examples of the external devices include, but are not limited to, a universal serial bus (USB) memory and a printer. The network I/F 509 is an interface for performing data communication using a network, such as the Internet. The bus line 510 is an address bus, a data bus, or the like for electrically connecting the components such as the CPU 501 illustrated in FIG. 3 each other.

The keyboard 511 is an example of an input device provided with a plurality of keys used to input characters, numerals, or various instructions. The pointing device 512 is an example of an input device that allows a user to select or execute various instructions, select an item for processing, or move a cursor being displayed. The DVD-RW drive 514 reads and writes various data from and to a DVD-RW 513, which is an example of a removable storage medium (recording medium). The DVD-RW drive 514 is not limited to the DVD-RW and may be a digital versatile disc-recordable (DVD-R), for example. The medium I/F 516 controls reading and writing (storing) of data from and to a storage medium 515 such as a flash memory.

Display Apparatus

Figure 4:
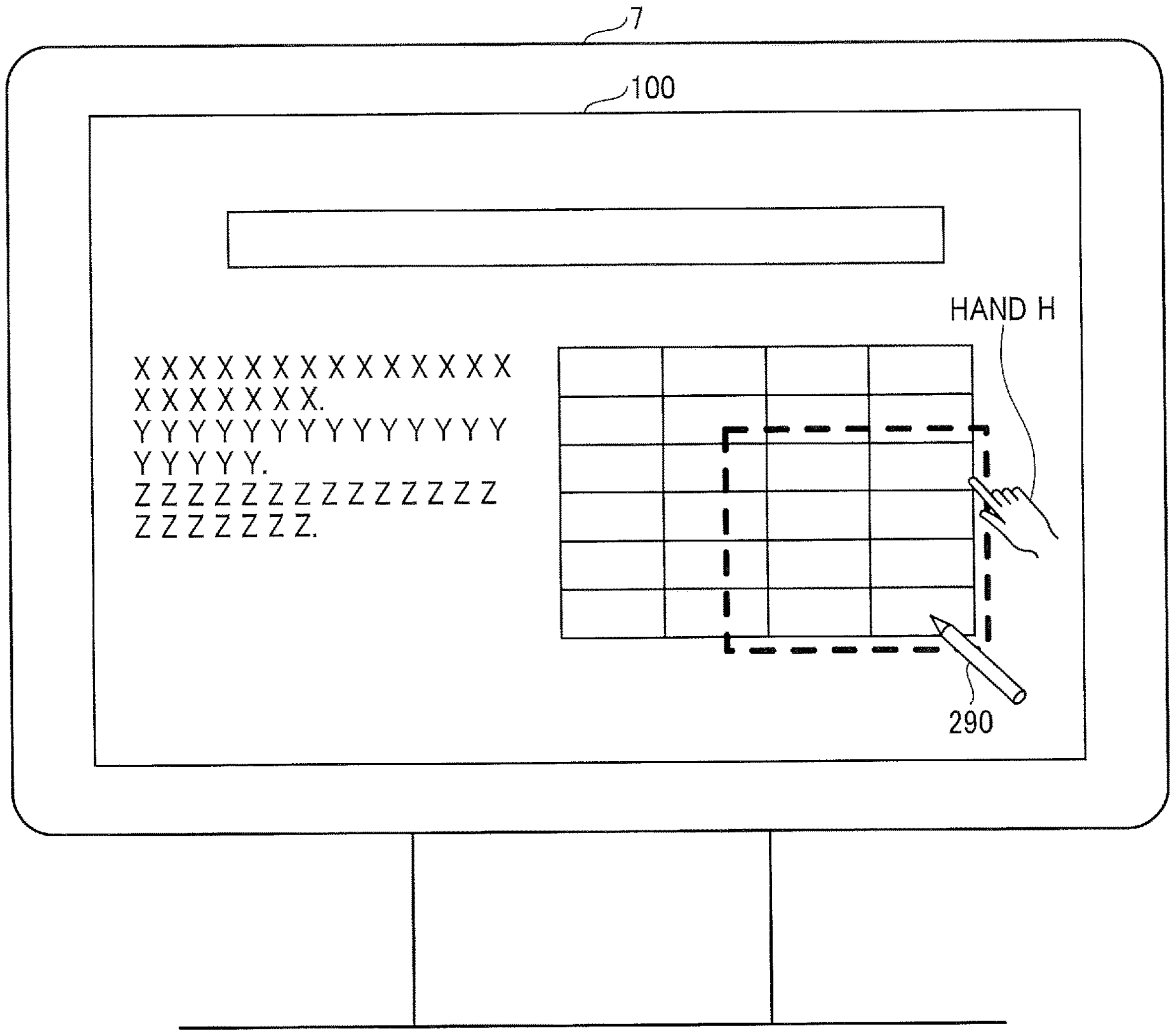
FIG. 4 is a diagram illustrating an example of a display apparatus according to the exemplary embodiment of the disclosure.

FIG. 4 is a schematic view of an example of the display apparatus 7 according to the present embodiment of the disclosure. On the display screen 100, image information of image data received by the display apparatus 7 is displayed. The display screen 100 receives a selection of a range of the image information being displayed, by according to a user operation performed by using the hand H or the electronic pen 290 for editing the image information in the selected range.

Functions

Figure 5:
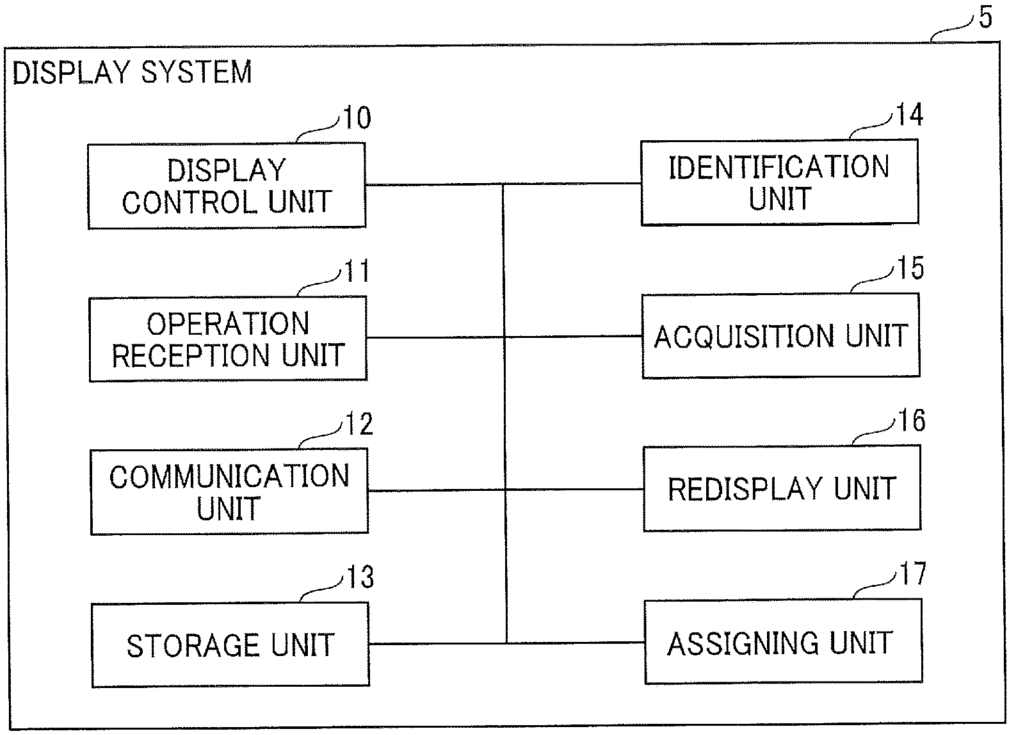
FIG. 5 is a block diagram illustrating an example of a functional configuration of the display system the exemplary embodiment of the disclosure.

FIG. 5 is a block diagram illustrating an example of a functional configuration of the display system 5 according to the present embodiment. In the example of FIG. 5, the display system 5 includes a display control unit 10, an operation reception unit 11, a communication unit 12, an identification unit 14, an acquisition unit 15, a redisplay unit 16, and an assigning unit 17. Each of these functional units is implemented by the CPU 201 or the CPU 501 executing an instruction included in one or more programs installed on the electronic whiteboard 2 or the terminal device 4. The display system 5 also uses a storage unit 13. The storage unit 13 is implemented by a storage device included in the storage server 3, the display apparatus 7, the terminal device 4, or the projector, for example.

The display control unit 10 displays image information of image data on a display screen of the display apparatus 7.

The operation reception unit 11 receives an operation such as inputting characters or pressing buttons by a user via a touch panel of the display apparatus 7 or the keyboard or the pointing device of the terminal device 4.

The communication unit 12 is, for example, a function of the display apparatus 7, and receives image data from the storage server 3 via the communication network 1.

The storage unit 13 stores image data to be displayed on a screen of the display apparatus 7, for example. The storage unit 13 also stores an edited image obtained after editing an image displayed on the display apparatus 7 as image data.

The identification unit 14 identifies each of lines corresponding to grid lines of a table present in a range specified by a user (specified range) on the screen of the display apparatus 7. The identification unit 14 also acquires information on coordinates of end points and intersection points of straight lines of the lines of a table, and color and thickness of each line. As a method of identifying each of the lines of a table, for example, a horizontal length and a vertical length of a specified range are calculated, and a straight line having a length equal to or greater than a value obtained by dividing each length by a predetermined ratio is set as each of the lines.

The acquisition unit 15 acquires a background color of a closed region surrounded by lines of a table (a cell region in a table) or a closed region surrounded by one or more lines of the table and one or more boundary lines of the specified range. As a method of acquiring the background color, for example, colors of pixels adjacent to a boundary line in the specified range are acquired, and a color of the most pixels is set as the background color. For example, an RGB (Red, Green, and Blue) color model is used as a pixel format in acquiring a color. One pixel is represented by three values (for example, 8 bits) indicating brightness of colors of red, green, and blue. These values are referred to as pixel values of a pixel.

A redisplay unit 16 changes a color of pixels in the specified range other than the coordinates of the lines of the table to a predetermined color, or the redisplay unit 16 changes all the pixels in each closed region to the same color as the background color, thereby displaying an image in which information such as characters is deleted while keeping the lines of the table in the specified range. For example, the predetermined color may be set by a user or a designer by using the RGB color model.

The assigning unit 17 assigns an address for identifying each closed region, which is a region surrounded by lines of a table in a specified range or a region surrounded by one or more lines of the table and one or more boundary lines of the specified range.

Flowchart of Process

Figure 6:
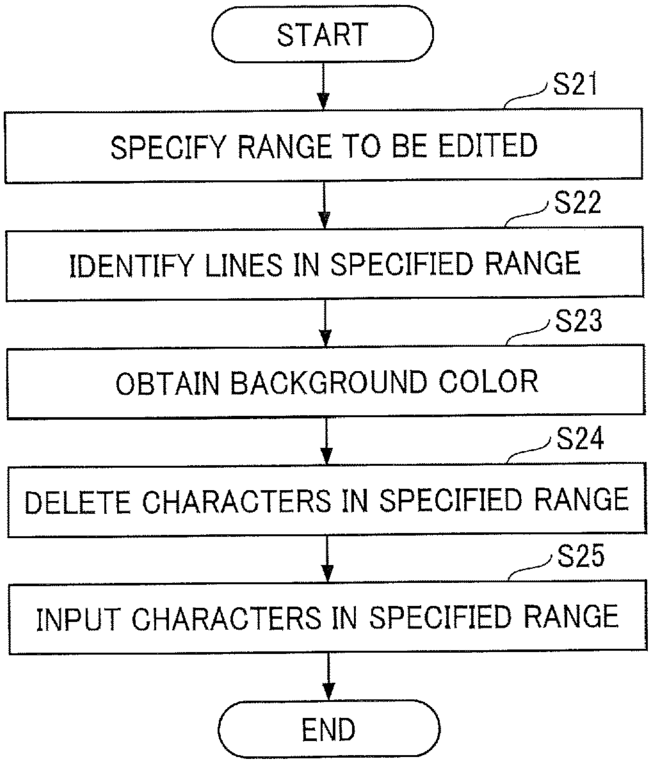
FIG. 6 is a flowchart illustrating an example of a process for editing characters while keeping a table format in an image according to the exemplary embodiment of the disclosure.

FIG. 6 is a flowchart illustrating an example of a process for editing characters (text) while keeping a table format in an image according to the present embodiment. In the following description of the present embodiment, the display apparatus 7 includes a touch panel display. Each step in the process is described below.

Figure 7:
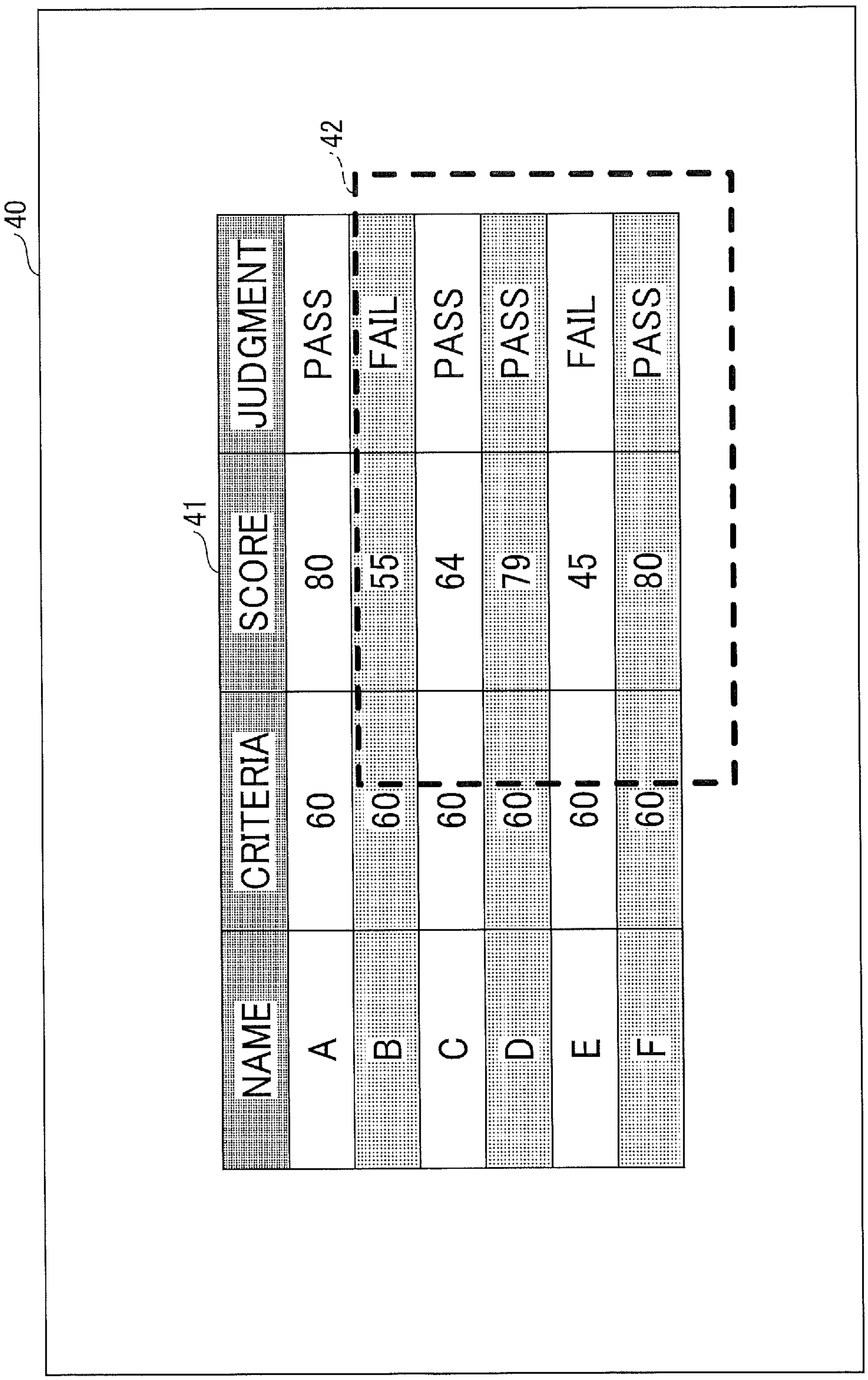
FIG. 7 is a diagram illustrating an example of a screen for specifying a range to be edited according to the exemplary embodiment of the disclosure.

Step S21: The operation reception unit 11 receives a user operation for specifying a range to be edited by using the hand H or the electronic pen 290 with respect to an image being displayed on the screen of the display apparatus 7. As a method of specifying a range, for example, assuming that a range to be specified is a rectangle, the user specifies or designates a pair of diagonal vertices of the rectangle. The range that is specified is referred to as a specified range. FIG. 7 is a diagram illustrating an example of a screen for specifying a range to be edited according to the present embodiment. In the example of FIG. 7, a specified range 42 is displayed. The specified range 42 is a part of a table 41 displayed on (inside of) a screen 40 and specified according to a user operation.

Referring again to FIG. 6, subsequent steps of the process are described below.

Figure 8:
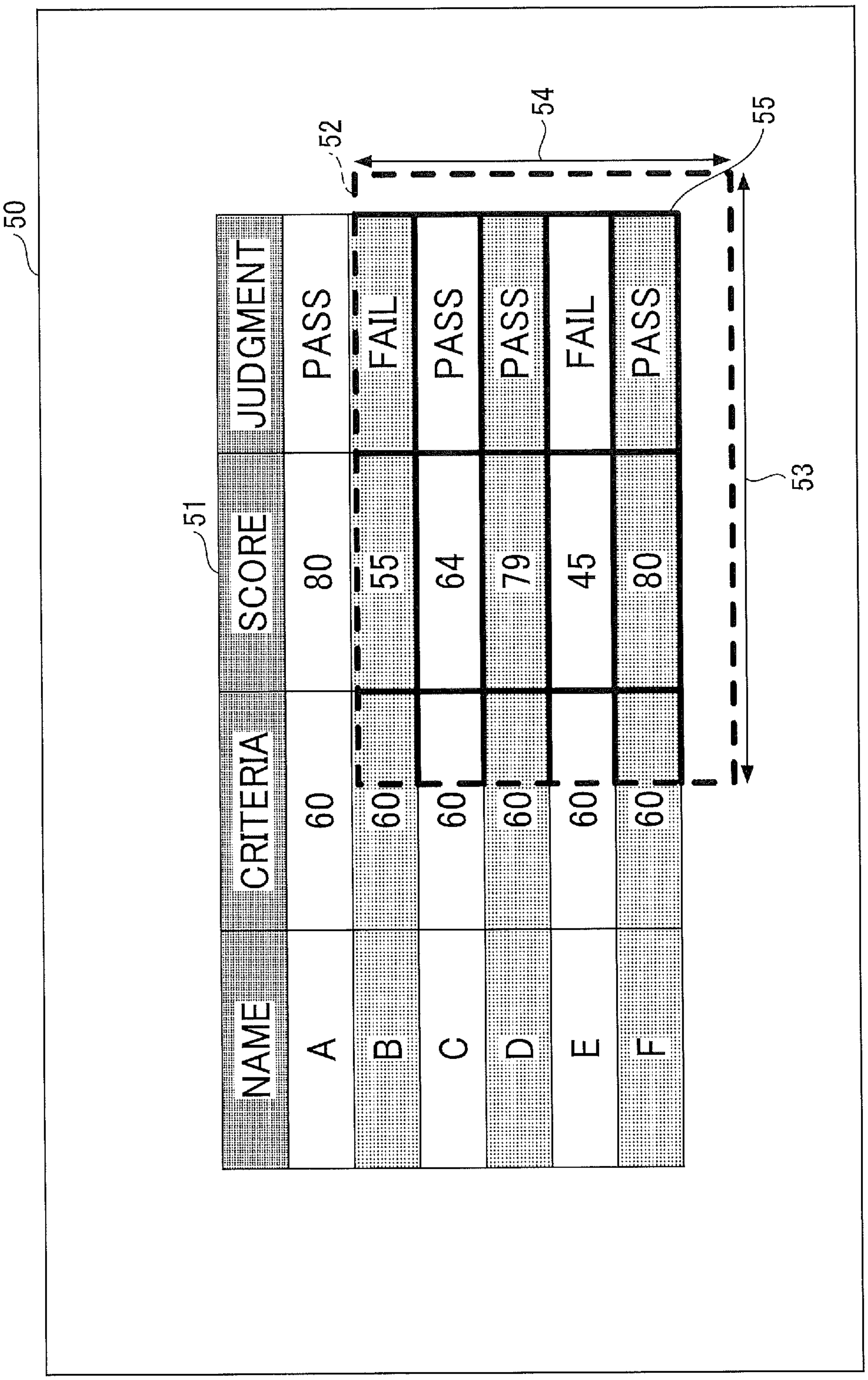
FIG. 8 is a diagram illustrating an example of a screen on which lines of a table are identified according to the exemplary embodiment of the disclosure.

Step S22: The identification unit 14 identifies lines of a part of the table presenting in the specified range. FIG. 8 is a diagram illustrating an example of a screen on which the lines of a part 55 of the table are identified according to the present embodiment. In the example of FIG. 8, a specified range 52 is displayed. The specified range 52 is a part of a table 51 displayed on (inside of) a screen 50 and specified according to a user operation. First, the identification unit 14 calculates a horizontal distance 53 that is a horizontal length of the specified range 52, and a vertical distance 54 that is a vertical length of the specified range 52. Next, the identification unit 14 identifies lines presenting in the specified range 52 by acquiring coordinates of end points and intersection points of straight lines of the lines. In order to prevent erroneously identifying as a line of the table, for example, a different straight line or a character that is other than the line of the table, the identification unit 14 identifies a straight line having a length equal to or greater than a value obtained by dividing the horizontal distance 53 or the vertical distance 54 by a predetermined value (a value equal to or greater than 1) as a line of the table among the straight lines in the specified range 52. As the predetermined value is larger, a shorter line can be recognized, however, at the same time, a ratio of recognizing a character as a line of the table also increases. Due to this reason, the predetermined value may be adjustable by a user. When the predetermined value is, for example, 10 in a large case, a straight line having a length equal to or greater than one tenth of the length in the horizontal direction or the vertical direction of the specified range is identified as a line of the table. In addition, the identification unit 14 acquires information on a color and thickness of the identified line. In order to allow the user to confirm the identified line, the display control unit 10 may display the line by increasing the thickness of the line or changing a color of the line.

Referring again to FIG. 6, subsequent steps of the process are described below.

Step S23: The acquisition unit 15 acquires a background color of each closed region surrounded by lines of the table (a cell region in the table) in the specified range 52 or each closed region surrounded by one or more lines of the table and one or more boundary lines of the specified range 52. When there are a plurality of closed regions, the acquisition unit 15 acquires the background color for each closed region. As a method of acquiring the background color, for example, colors of pixels adjacent to a boundary line in the specified range are acquired, and a color of the most pixels is set as the background color. For example, the RGB color model is used as a pixel format in acquiring a color. In the following description of embodiments, an area in which the background color is acquired is simply referred to as a "closed region".

Figure 9:
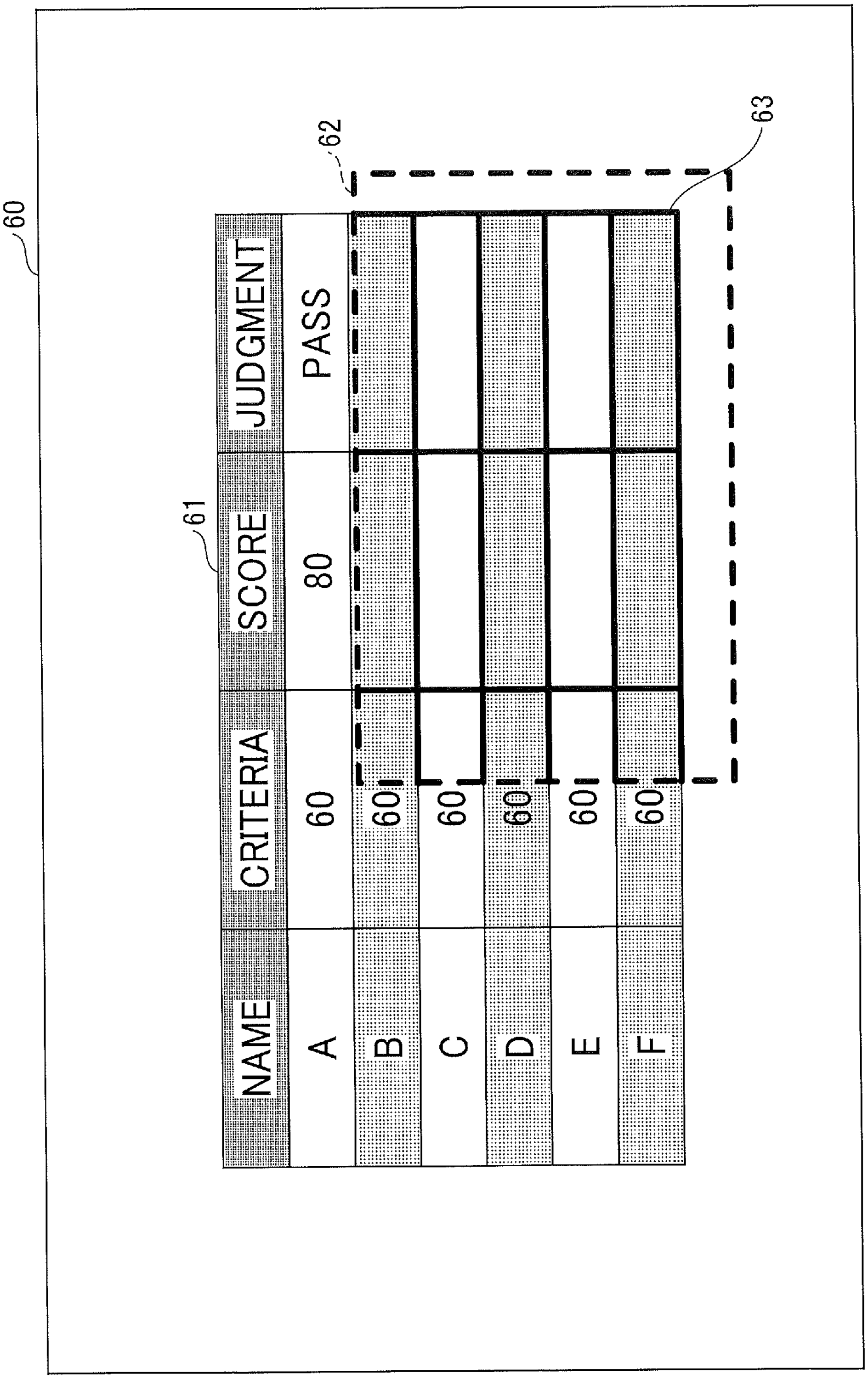
FIG. 9 is a diagram illustrating an example of a screen in which characters are deleted and a table format remains according to the exemplary embodiment of the disclosure.

Step S24: The redisplay unit 16 changes the color of all pixels different from the background color in each closed region other than the pixels of the coordinates of the lines of the table to the same color as the background color, thereby displaying an image in which information including characters is deleted and the lines remain in the specified range. FIG. 9 is a diagram illustrating an example of a screen in which characters are deleted and a table format remains according to the present embodiment. In the example of FIG. 9, a specified range 62 that is specified according to a user operation and includes a part 63 of a table 61 is displayed on (inside of) a screen 60. In the specified range 62 of the example of FIG. 9, characters presented in the specified range 62 (the part 63 of the table 61) has deleted by overriding with the background color.

Alternatively, the redisplay unit 16 may change all pixels within the specified range other than the pixels corresponding to the drawing positions of the lines of the table to a predetermined color. In a case that this method is used, it is not necessary to acquire the background color of each closed region in step S23. However, when the background color within the specified range is different from the predetermined color, the original background color is changed. In this case, the characters presented in the specified range 62 are deleted by being overrode with the predetermined color.

The redisplay unit 16 may display the lines of the table again after changing the colors of all the pixels in each closed region including the coordinates of the lines or the colors of all the pixels in the specified range, thereby obtaining the same result as the above-described processing.

Referring again to FIG. 6, subsequent steps of the process are described below.

Step S25: The operation reception unit 11 receives a user operation of inputting a character in the specified range. A character can be input to the touch panel of the display apparatus 7 in substantially the same manner as the operation of inputting a character by using the hand H or the electronic pen 290.

In addition, the storage unit 13 may store an image edited on the screen of the display apparatus 7 as image data.

First Variation

Figure 10:
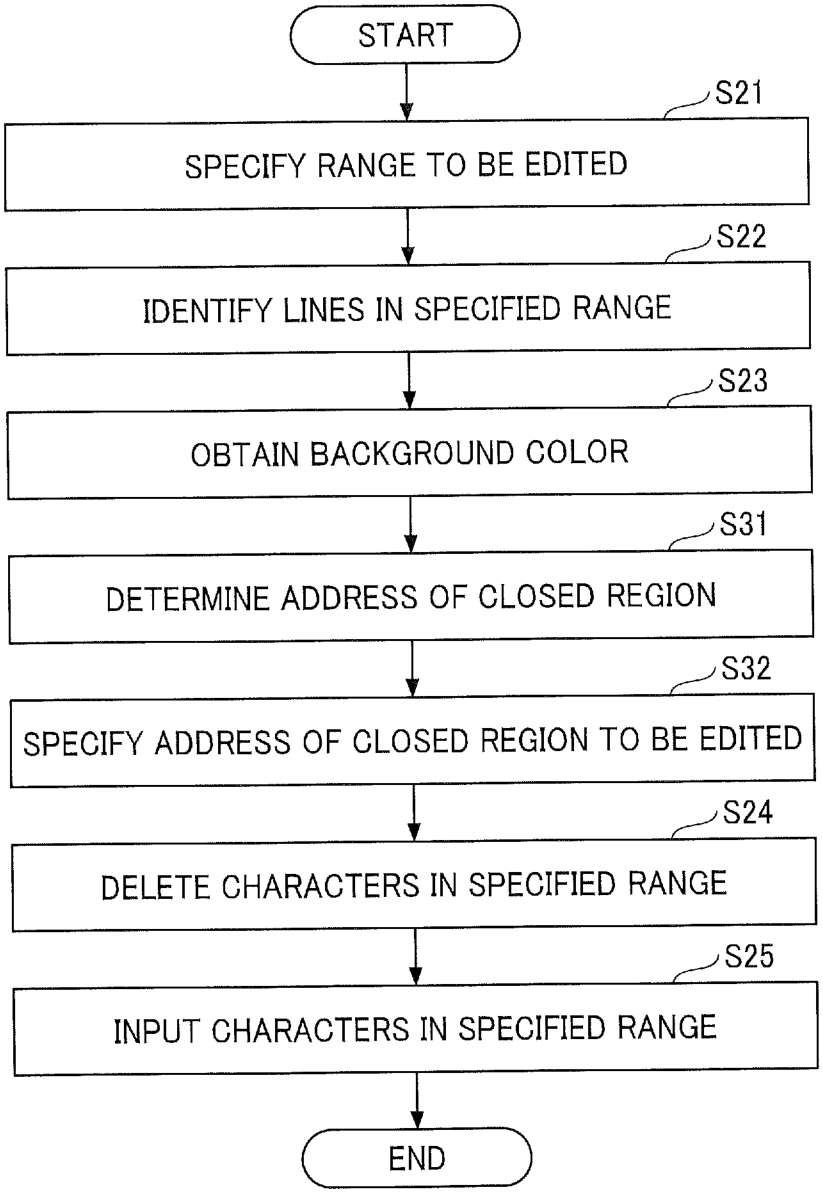
FIG. 10 is a flowchart illustrating an example of a process for editing characters in a closed region specified according to a first variation of the exemplary embodiment of the disclosure.

A first variation of the first embodiment is described below, in particular, regarding differences from the first embodiment. FIG. 10 is a flowchart illustrating an example of a process for editing characters (text) in a closed region specified according to the first variation. In the first variation, each closed region, which is a region surrounded by lines of the table in the specified range or a region surrounded by one or more lines of the table and one or more boundary lines of the specified range, is specified for deleting or editing characters. A difference from the first embodiment is that additional steps of processing are added between step S23 and step S24 of the sequence diagram illustrated in FIG. 6 in the first variation. Each step added according to the first variation is described below.

Figure 11:
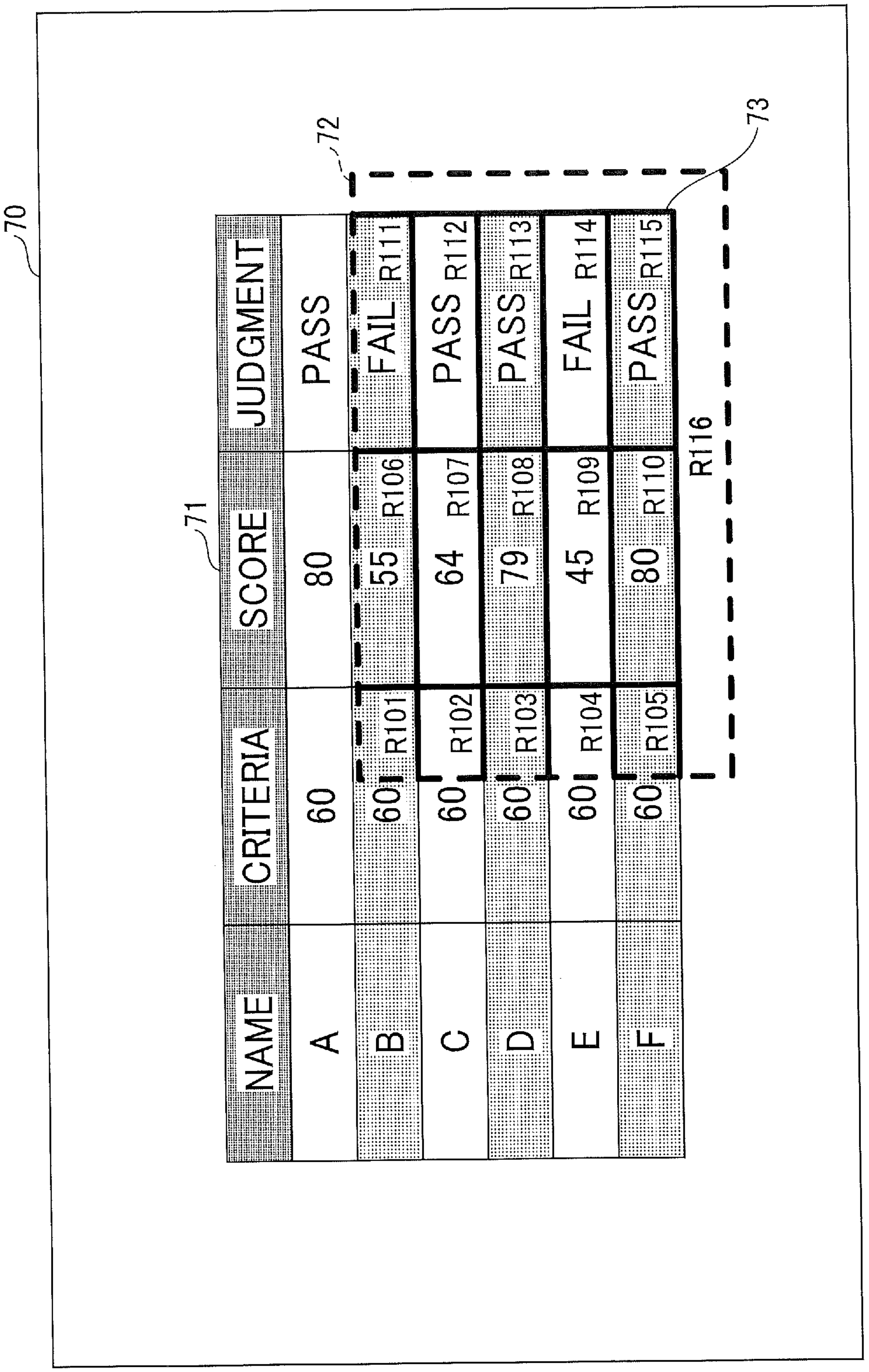
FIG. 11 is a diagram illustrating an example of a screen for assigning an address to a closed region according to a first variation of the exemplary embodiment of the disclosure.

Step S31: The assigning unit 17 assigns an address for identifying each closed region, which is a region surrounded by lines of the table in the specified range or a region surrounded by one or more lines of the table and one or more boundary lines of the specified range. FIG. 11 is a diagram illustrating an example of a screen for assigning an address to each closed region according to the first variation. In the example of FIG. 11, in a specified range 72 specified according to a user operation and including a part 73 of a table 71 in a screen 70, addresses R101 to R115 for identifying respective closed regions each of which is a region surrounded by lines of the table in the specified range 72 or a region surrounded by one or more lines of the table and one or more boundary lines of the specified range 72 are assigned.

Referring again to FIG. 10, a further description is given below.

Figure 12:
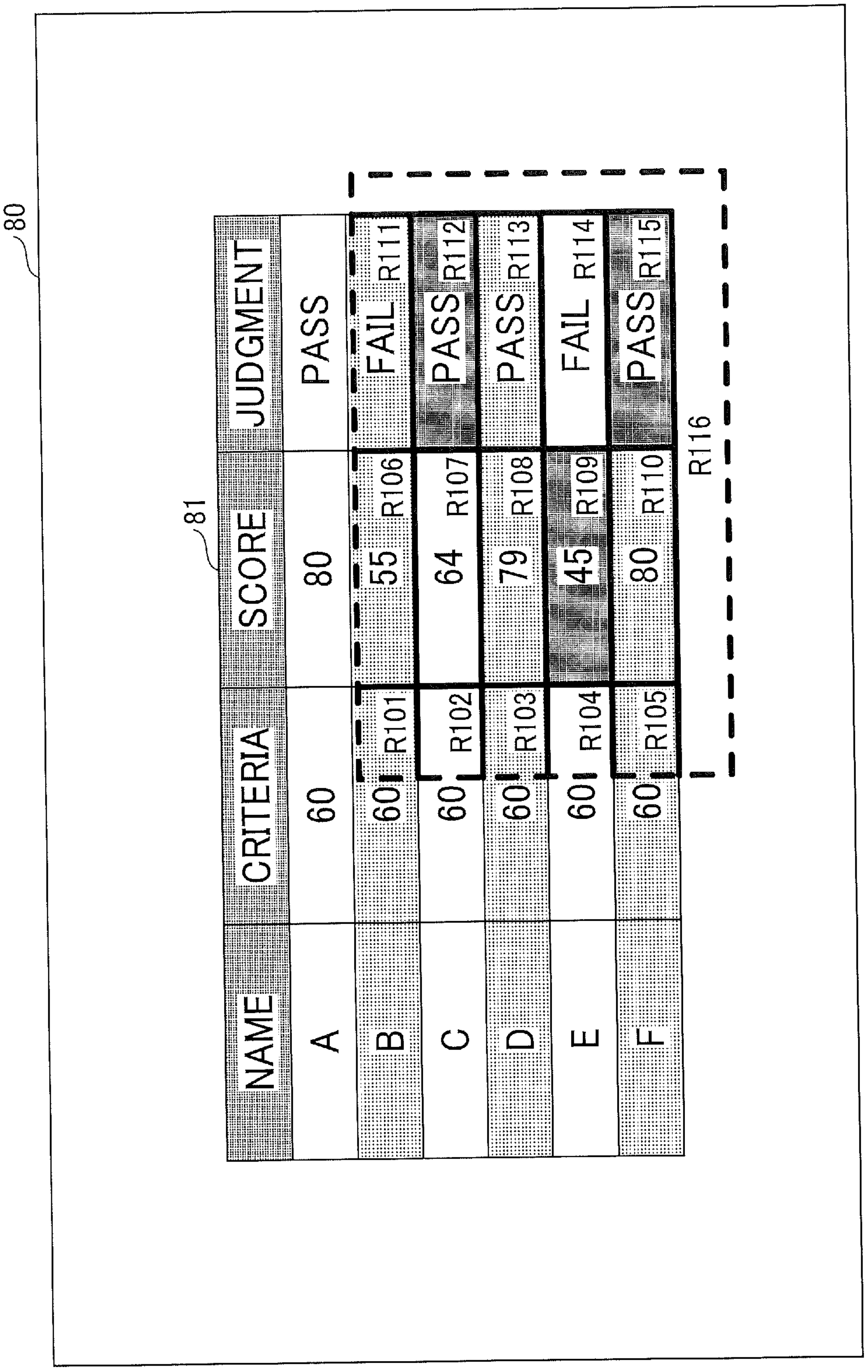
FIG. 12 is a diagram illustrating an example of a screen on which a background color of a specified closed region is changed according to a first variation of the exemplary embodiment of the disclosure.

Step S32: The operation reception unit 11 receives an operation of specifying a closed region to be edited by the user. Specifying the closed region to be edited is performable according to a user operation by clicking the closed region to be specified using the hand H or the electronic pen 290, for example. In response to a user operation of clicking on a closed region to be specified, the display control unit 10 can change the background color of the specified closed region to allows the user to confirm that the specifying operation has been accepted. FIG. 12 is a diagram illustrating an example of a screen on which a background color of a specified closed region is changed according to the first variation. In the example of FIG. 12, in a table 81 in a screen 80, a background color of each of closed regions corresponding to addresses R109, R112, and R115 specified by the user are changed.

Referring again to FIG. 10, a further description is given below.

In the subsequent step S24, in the first variation, the closed region specified by the user is overrode with the background color, and the character strings are deleted. In step 25, character input is performable in the closed region specified by the user.

Figure 13:
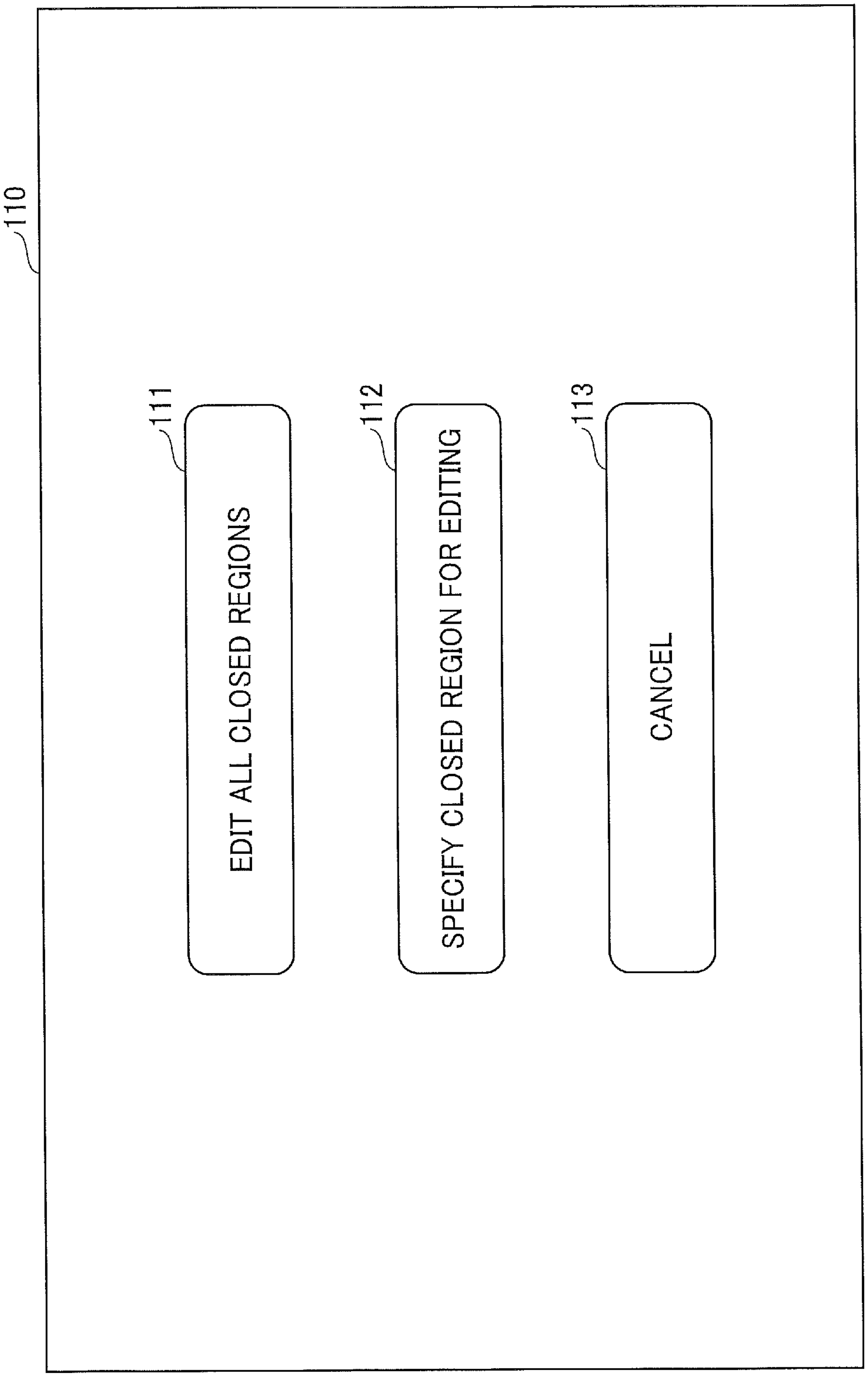
FIG. 13 is a diagram illustrating an example of a screen of confirmation screen for allowing a user to check whether to specify a closed region according to the exemplary embodiment of the disclosure.

Further, after the execution of step S23 and before the transition to step S31, the display control unit 10 may display a screen for allowing the user to check whether to delete the character strings of all closed regions or to specify a closed region to be edited. FIG. 13 is a diagram illustrating an example of a screen of confirmation screen for allowing a user to check whether to specify a closed region according to the present embodiment. In the example of FIG. 13, a button 111 for editing all closed regions, a button 112 for specifying one or more closed regions to be edited, and a button 113 for cancelling are displayed on a screen 110. The operation reception unit 11 receives a user operation of pressing one of the buttons 111, 112, and 113. When the button 111 is pressed, the process illustrated in FIG. 6 is executed, when the button 112 is pressed, the process (first variation) illustrated in FIG. 10 is executed, and when the button 113 is pressed, for example, the process is shifted to the first processing (step S21).

Second Variation

As a second variation of the first embodiment of the present disclosure, a case where no line of the table is present in the range specified by the user in step S21 of FIG. 6 or FIG. 10 is described below.

Figure 14:
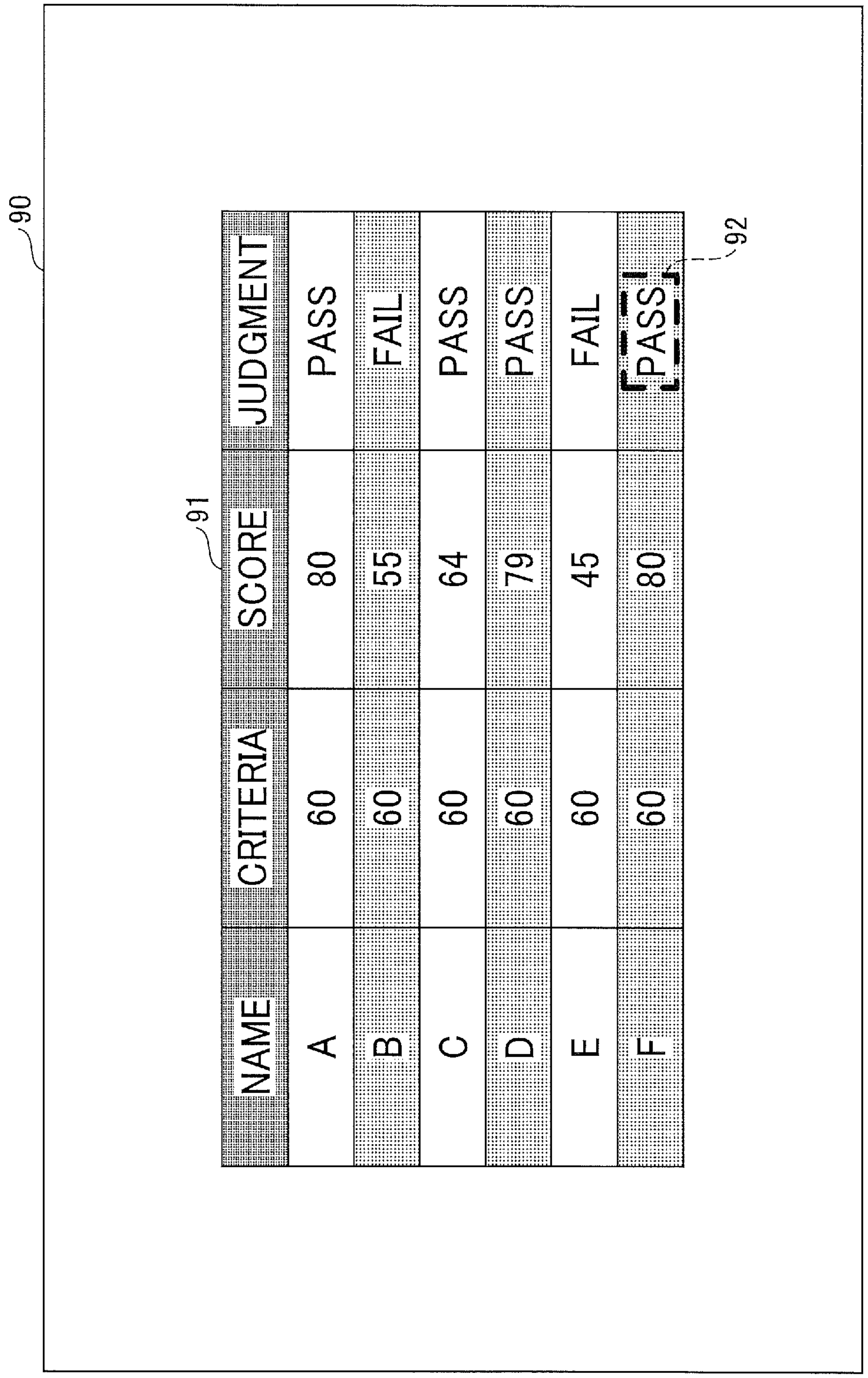
FIG. 14 is a diagram illustrating an example of a screen in which a specified range does not include any line of a table according to a second variation of the exemplary embodiment of the disclosure.

FIG. 14 is a diagram illustrating an example of a screen in which a specified range does not include any line of a table according to the second variation. In the example of FIG. 14, a specified range 92 is displayed. The specified range 92 is a part of a table 91 displayed on (inside of) a screen 90 and specified according to a user operation. The specified range 92 does not include any line of the table 91. In such a case, no line is identified in step S22 in FIG. 6 or FIG. 10, but the specified range 92 is regarded as a closed region to be edited in step S23, and the acquisition unit 15 executes the processing in the subsequent step in substantially the same manner and acquire a background color in the specified range 92. The character string can be deleted, and editing is performable, accordingly.

In the first embodiment of the present disclosure, the display apparatus 7 can delete the characters while keeping the table format, within the range specified by a user (specified range) included in the image data displayed on the screen. In addition, the display apparatus 7 can allow the user to specify a closed region to be edited among from the closed regions each of which is a region surrounded by lines of the table in the specified range or a region surrounded by one or more lines of the table and one or more boundary lines of the specified range.

For example, there is a use case in which a user connects a laptop computer to the electronic whiteboard 2 using a cable for outputting material (image) including a table being displayed on a screen of the laptop computer to the electronic whiteboard 2, so that the user discusses with other users while viewing the image being displayed on the electronic whiteboard 2. In such a case, the user can edit the displayed table by using a function or an application of the electronic whiteboard 2 without performing an operation with respect to an application such as a spreadsheet or a presentation in the laptop computer. In other words, the user can edit the table displayed on the electronic whiteboard 2 without activating any application of a file that is a source of the image displayed on the electronic whiteboard 2.

The description above concerns some of embodiments of the present disclosure. Embodiments of the present disclosure are not limited to the specific embodiments described above, and various modifications and replacements are possible within the scope of aspects of the disclosure.

For example, FIG. 5 illustrates an example of the block diagram in which the functional units are divided into blocks in accordance with main functions of the display system 5, in order to facilitate understanding of the operation by the display system 5. Each processing unit or each name of the processing unit is not to limit the scope of the present disclosure. The processing implemented by the display system 5 may be divided into a larger number of processing units depending on the content of the processing. In addition, a single processing unit can be further divided into a plurality of processing units.

Each of the functions of the described embodiments may be implemented by one or more processing circuits or circuitry. Here, the "processing circuit or circuitry" in the present specification includes a programmed processor to execute each function by software, such as a processor implemented by an electronic circuit, and devices, such as an application specific integrated circuit (ASIC), a digital signal processors (DSP), a field programmable gate array (FPGA), and conventional circuit modules arranged to perform the recited functions.

The group of apparatuses or devices described above is one example of plural computing environments that implement the embodiments disclosed in this specification. In some embodiments, the display system 5 includes multiple computing devices, such as a server cluster. The plurality of computing devices is configured to communicate with one another through any type of communication link, including a network, shared memory, etc., and perform the processes disclosed herein.

In a related art, characters are failed to be deleted while lines of a table present in a specified range in an image are kept.

According to an embodiment of the present disclosure, characters are deleted while lines of a table present in a specified range in an image are kept.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The present disclosure can be implemented in any convenient form, for example using dedicated hardware, or a mixture of dedicated hardware and software. The present disclosure may be implemented as computer software implemented by one or more networked processing apparatuses. The network can include any conventional terrestrial or wireless communications network, such as the Internet. The processing apparatuses can include any suitably programmed apparatus such as a general purpose computer, personal digital assistant, mobile telephone (such as a wireless application protocol (WAP) or 3G-compliant phone), for example. Since the present disclosure can be implemented as software, each or every aspect of the present disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a CPU, an RAM, and an HDD. The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. A display apparatus, comprising circuitry configured to:

display, on a display, an image including a table;

receive an operation of specifying a range to be edited in the image;

acquire coordinates of grid lines of the table in the range;

identify the grid lines that exist in the range;

acquire information on a color and thickness of the identified grid lines;

display the identified grid lines by increasing the thickness of the identified grid lines or changing the color of the identified grid lines; and change a color of pixels other than pixels corresponding to the grid lines of the table in the range to a predetermined color.

2. The display apparatus of claim 1, wherein the circuitry acquires a background color of each of one or more closed regions, each of the one or more closed region being one of a region surrounded by corresponding ones of the grid lines or a region surrounded by one or more of the grid lines and one or more of boundary lines of the range, and changes a color of pixels in each of the one or more closed regions to the background color.

3. The display apparatus of claim 2, wherein the circuitry assigns, to each of the one or more closed regions, an address for identifying a corresponding one of the one or more closed regions, and receives an operation of specifying one of the one or more closed regions as a closed region to be edited.

4. The display apparatus of claim 3, wherein the circuitry displays, on the display, a screen for selecting whether to edit characters in the range or to specify one or more of the closed regions to be edited.

5. The display apparatus of claim 2, wherein in case that the table in the range includes no grid line, the circuitry changes the color of the pixels in the range to the background color.

6. The display apparatus of claim 1, wherein in case that the table in the range includes no grid line, the circuitry changes the color of the pixels in the range to the predetermined color.

7. A display system, comprising:

the display apparatus of claim 1; and a terminal device communicably connected to the display apparatus, the terminal device including terminal device circuitry configured to output on a screen of the display apparatus, the image including the table.

8. A display system, comprising:

the display apparatus of claim 1; and a storage server including storage sever communicably connected to the display apparatus, the storage server including storage server circuitry configured to store image data representing the image including the table, and transmit the image data to the display apparatus, wherein the display apparatus displays the image including the table based on the image data received from the storage server.

9. The display apparatus of claim 1, wherein
the circuitry
calculate a horizontal distance that is a horizontal length of the range, and a vertical distance that is a vertical length of the range, and
identify a straight line within the range having a length equal to or greater than a value obtained by dividing the horizontal distance or the vertical distance by a predetermined value as the grid lines of the table in the range.

10. A display control method, comprising:
displaying, on a display, an image including a table;
receiving an operation of specifying a range to be edited in the image;
acquiring coordinates of grid lines of the table in the range;
identifying the grid lines that exist in the range;
acquiring information on a color and thickness of the identified grid lines;
displaying the identified grid lines by increasing the thickness of the identified grid lines or changing the color of the identified grid lines; and
changing a color of pixels other than pixels corresponding to the grid lines of the table in the range to a predetermined color.

11. A non-transitory recording medium storing a plurality of instructions which, when executed by one or more processors, causes the processors to perform a method, the method comprising:
displaying, on a display, an image including a table;
receiving an operation of specifying a range to be edited in the image;
acquiring coordinates of grid lines of the table in the range;
identifying the grid lines that exist in the range;
acquiring information on a color and thickness of the identified grid lines;
displaying the identified grid lines by increasing the thickness of the identified grid lines or changing the color of the identified grid lines; and
changing a color of pixels other than pixels corresponding to the grid lines of the table in the range to a predetermined color.

* * * * *